J. W. VAN METER.
PERCUSSIVE APPARATUS.
APPLICATION FILED APR. 30, 1919.

1,368,079.

Patented Feb. 8, 1921.
5 SHEETS—SHEET 1.

WITNESS
Bradley L. Benson

INVENTOR
James W. Van Meter
BY John H. Milligan
ATTORNEYS

J. W. VAN METER.
PERCUSSIVE APPARATUS.
APPLICATION FILED APR. 30, 1919.
1,368,079.
Patented Feb. 8, 1921.
5 SHEETS—SHEET 3.
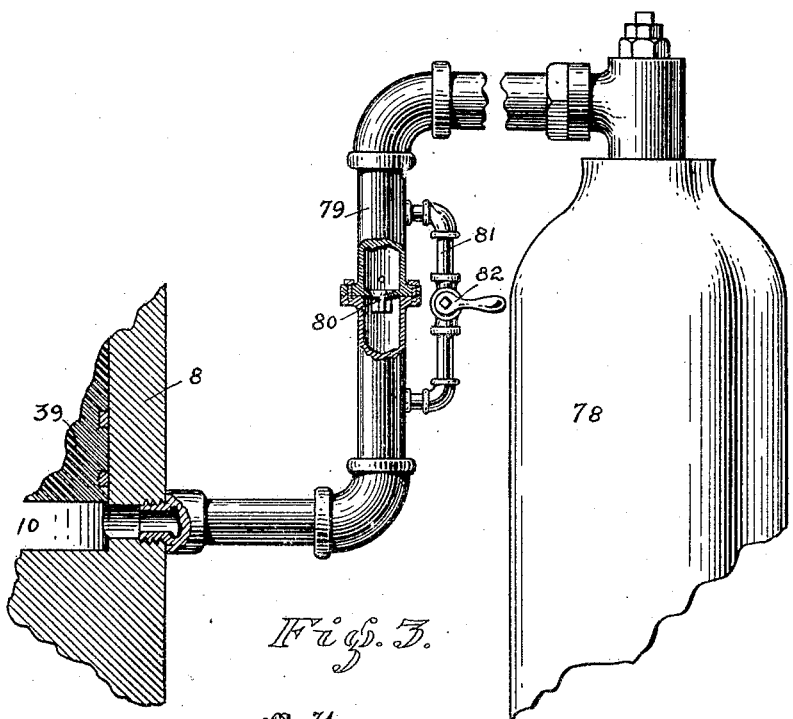
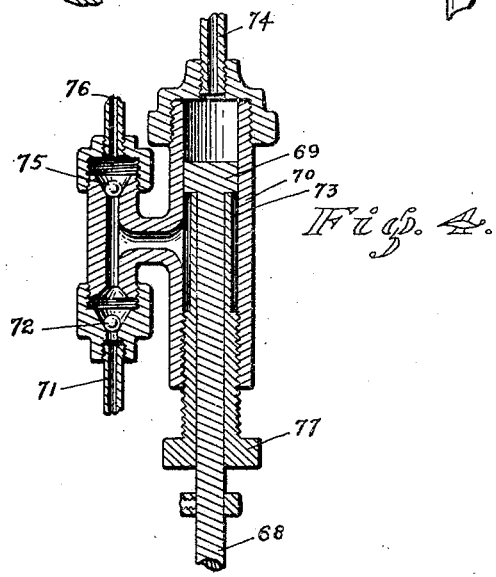
WITNESS
Bradley L. Benson
INVENTOR
James W. Van Meter
BY
John H. Miller
ATTORNEYS

J. W. VAN METER.
PERCUSSIVE APPARATUS.
APPLICATION FILED APR. 30, 1919.

1,368,079.

Patented Feb. 8, 1921.
5 SHEETS—SHEET 4.

WITNESS
Bradley L. Benson

INVENTOR
JAMES W. VAN METER
BY John H. Miller
ATTORNEYS

J. W. VAN METER.
PERCUSSIVE APPARATUS.
APPLICATION FILED APR. 30, 1919.

1,368,079.

Patented Feb. 8, 1921.
5 SHEETS—SHEET 5.

WITNESS
Bradley L. Benson

INVENTOR
JAMES W. VAN METER
BY
John H. Miller
ATTORNEYS

UNITED STATES PATENT OFFICE.

JAMES W. VAN METER, OF SAN FRANCISCO, CALIFORNIA, ASSIGNOR TO GRANVILLE MOORE, OF SAN FRANCISCO, CALIFORNIA.

PERCUSSIVE APPARATUS.

1,368,079.   Specification of Letters Patent.   Patented Feb. 8, 1921.

Application filed April 30, 1919. Serial No. 293,806.

*To all whom it may concern:*

Be it known that I, JAMES W. VAN METER, a citizen of the United States, and a resident of the city and county of San Francisco, State of California, have made a new and useful invention—to wit, an Improvement in Percussive Apparatus; and I hereby declare the following to be a written description of the same in such full, clear, concise, and exact terms as to enable any person skilled in the art to which it appertains or to which it is most nearly connected to make, construct, and use the same.

This invention relates to a new and useful improvement in machines commonly known as stamp mills in which the stamps ordinarily drop by gravity.

The primary object of the invention is to apply an internal combustion engine to a gravity dropping stamp, so that the explosion will augment the gravity drop of the stamp, and then to raise the stamp to its initial position automatically for repeated dropping.

While I have described the invention as applied to a stamp mill as the preferred form of embodiment, I do not limit it or the appended claims to such a device but desire it to be understood that the invention may also be applied to drilling, pile-driving and other uses where a blow is desired. Consequently the claims are intended to cover all such uses.

In the drawings:

Fig. 3 is an enlarged detail view of my compressed air connection.

Fig. 4 is an enlarged detail of my fuel pump.

Figure 5:
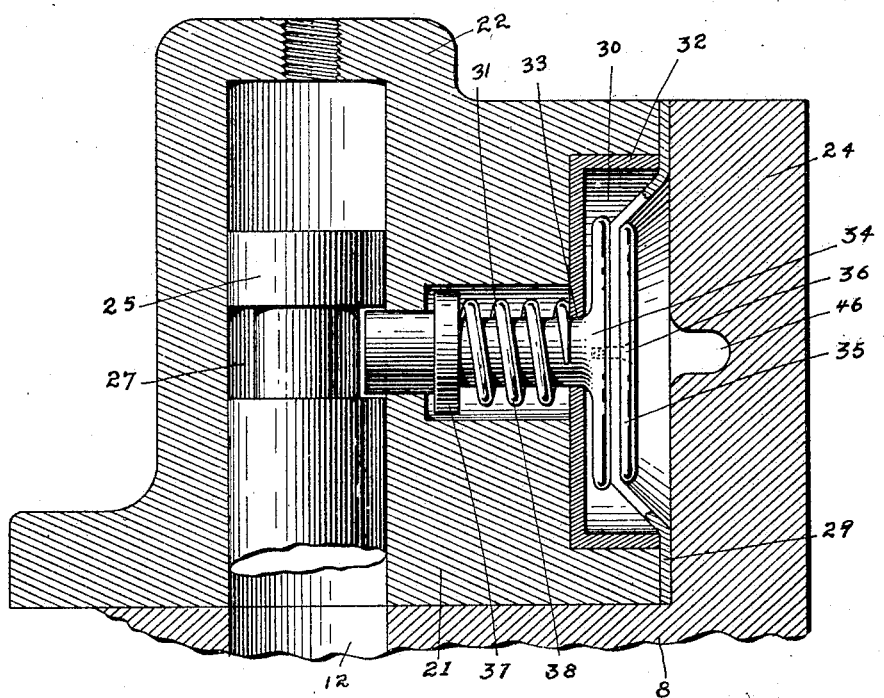
Fig. 5 is an enlarged detail of one of my valve latches.
Figure 6:
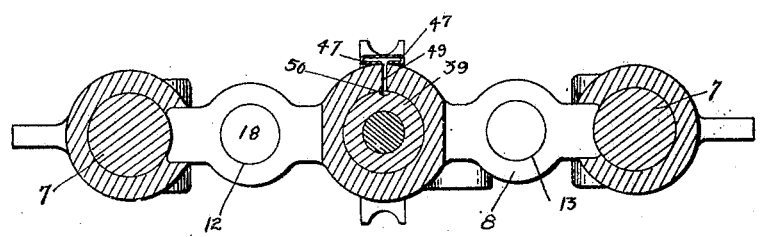
Fig. 6 is a cross section of the head casting taken on the line VI—VI Fig. 2.
Figure 7:
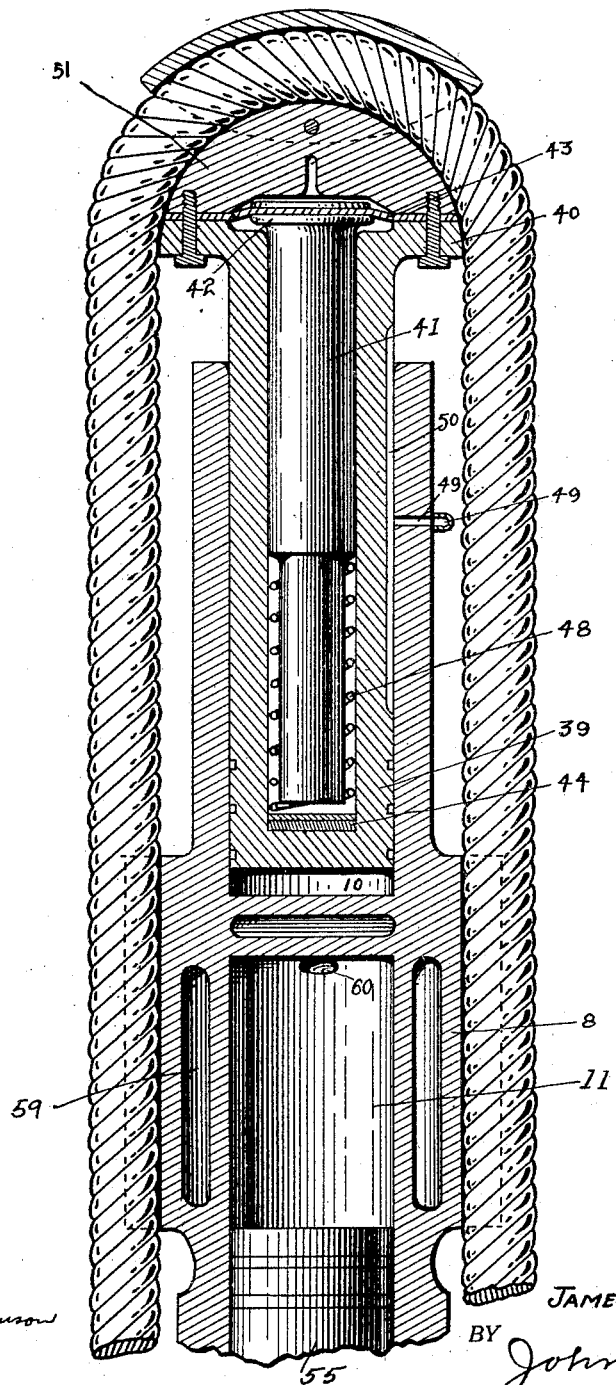
Fig. 7 is a side elevation in central section on the line 7—7 Fig. 2.

Referring to the drawings in detail, the numeral 5 designates a base carrying the usual table 6. The numerals 7 refer to vertical parallel standards carried by the base 5. At the upper ends of these standards I mount a head casting 8 which is keyed to the standards by pins 9. This casting is provided with a central bore 10, which will hereinafter be called a lifting chamber. Beneath this bore, I provide a chamber 11, which will be hereinafter called a combustion chamber. Parallel to these chambers 10 and 11, and between the same and the upper end of the standards 7, I provide longitudinal passages 12 and 13. These passages are enlarged at their upper end to accommodate springs 14 and 15 which surround reciprocating valves 16 and 17 respectively. The valve 16 will be known as the exhaust valve and the valve 17 as the inlet valve. These valves are similar in construction, and differ only at their lower ends. The exhaust valve 16 has a head 18 against which the spring 14 presses: At the lower end of the valve I provide a piston 20 which slides in the passage 12. A shoulder 19 is provided in the passage 12 to limit the movement of said valve. The inlet valve 17 is similar in construction, as before mentioned, with the exception that a piston is formed with an annular space as at 21. Both of these valves carry suitable packings upon their piston portions, in order that a tight joint may be made between the said valves and the sides of said passages 12 and 13. Mounted above the head casting and attached thereto are valve castings 22. These castings are alike in construction, and consequently but one will be described. The valve mechanism mounted within one of these castings is best shown in Fig. 5. These castings are attached to the head casting by tapering screws 23.

Mounted within the valve castings are valve depressing pins 25 and 26. These pins rest upon the heads of the valves 16 and 17, and are provided at their upper ends with annular recesses 27 and 28. In each casting, I provide a vacuum latch mechanism which is best shown in Fig. 5. As they are similar in construction only one will be described. A diaphragm 29 of leather or other suitable material is provided and held between the part 24 of the head casting and the valve casting 21. The casting 21 is provided with a chamber 30 and a horizontal bore 31.

Mounted within the chamber 30 is a cup-shaped member 32 having an opening 33 at its center through which the vacuum latch 34 reciprocates. This latch has a plate 35 attached thereto by a screw 36 which passes through the diaphragm 29. As the head of the latch 34 and the plate 36 are circular in form, a large part of the diaphragm lies between the head member 34 and the plate 36. The stem of the member 34 passes through an opening in the casting 21, and is adapted to enter the annular passage 27 of the valve depressing pin 25. In order that this latch 34 will tend at all times to enter the passage 27, I provide a collar 37 and a spring 38, one end of which spring presses against said collar 37 and the opposite end against the rear of the cup shaped member 32.

Slidably mounted within the lifting chamber 10 is a lifting piston 39 having an enlarged head 40. This lifting piston is hollow to provide for an inertia plunger 41 having a flat head 42 adapted to engage a diaphragm 43. This plunger 41 is supported by a spring 48 mounted in the lower end of said hollow piston and encircling a reduced portion of said inertia plunger.

I have shown a rubber buffer 44 against which said inertia plunger will strike, as will be hereinafter explained. The numerals 45 indicate pipes connected to a horizontal passage, which in turn are connected by a vertical passage to the chamber above said diaphragm 43. These pipes 45 are preferably flexible and connect to passages 46 in the parts 24 of the head casting. These passages open to the chamber in the valve casting wherein the diaphragm 29 is mounted.

Mounted above and in communication with the top of the valve depressing pins are pipes 47 which join and have a common inlet 49 to the lifting chamber 10. The lifting piston 39 is provided with a vertical passage 50, the purpose of which will be hereinafter described.

Carried by the upper end of the lifting piston is a yoke 51 having a retainer 52 adapted to engage a cable 53 passing over said yoke. This cable extends down the sides of the machine, and is connected at its lower ends to a collar 54 pinned or in any other manner attached to the plunger 55. This plunger 55 carries at its lower end a stamp 56, and is guided by a member 57 carrying a bushing 58. The upper end of this plunger 55 is provided with rings and slides within the combustion chamber 11 thus forming a piston integral with the stamp. The combustion chamber is water cooled by suitable water passages 59 around the sides and top of said combustion chamber.

At 60 I have shown an exhaust port, and at 61 an inlet port, and at 62 a fuel inlet, and at 63 a compressed air inlet. The numerals 64 indicate a spark plug.

Mounted upon the collar 54 is a buffer 65 having a buffer plate 66. This collar also carries a striker 67 which is adapted to strike the end of a pump rod 68 when said collar ascends with said stamp. The striking of the pump rod 68 forces the same upwardly causing a vacuum as the head 69 rises in the pump cylinder 70. This vacuum draws fuel from the pipe 71 past check valve 72 into the annular chamber 73. As soon as the rod 68 descends through the action of compressed air from the pipe 74, the fuel in the annular chamber 73 is forced out past check valve 75 and through pipe 76 through port 62 and into the passage 61 at which point it mixes with compressed air from port 63 and enters the combustion chamber as a combustible mixture. The length of stroke of the fuel pump may be regulated by the turning of nut 77, as the head 69 can only be pushed downwardly by the compressed air from the pipe 74 until it strikes the end of the nut 77 which is reduced to form the annular chamber 73.

In Fig. 3 I have shown an air tank 78 and a fragment of the head casting 8, also a fragment of the lifting piston 39. The numeral 79 designates a compressed air pipe of large diameter having a check valve 80 mounted within its length.

The numeral 81 refers to a by-pass having a valve 82 mounted therein for the purpose of regulating the flow of air around the check valve 80. The operation of this will be hereinafter described.

Figure 1:
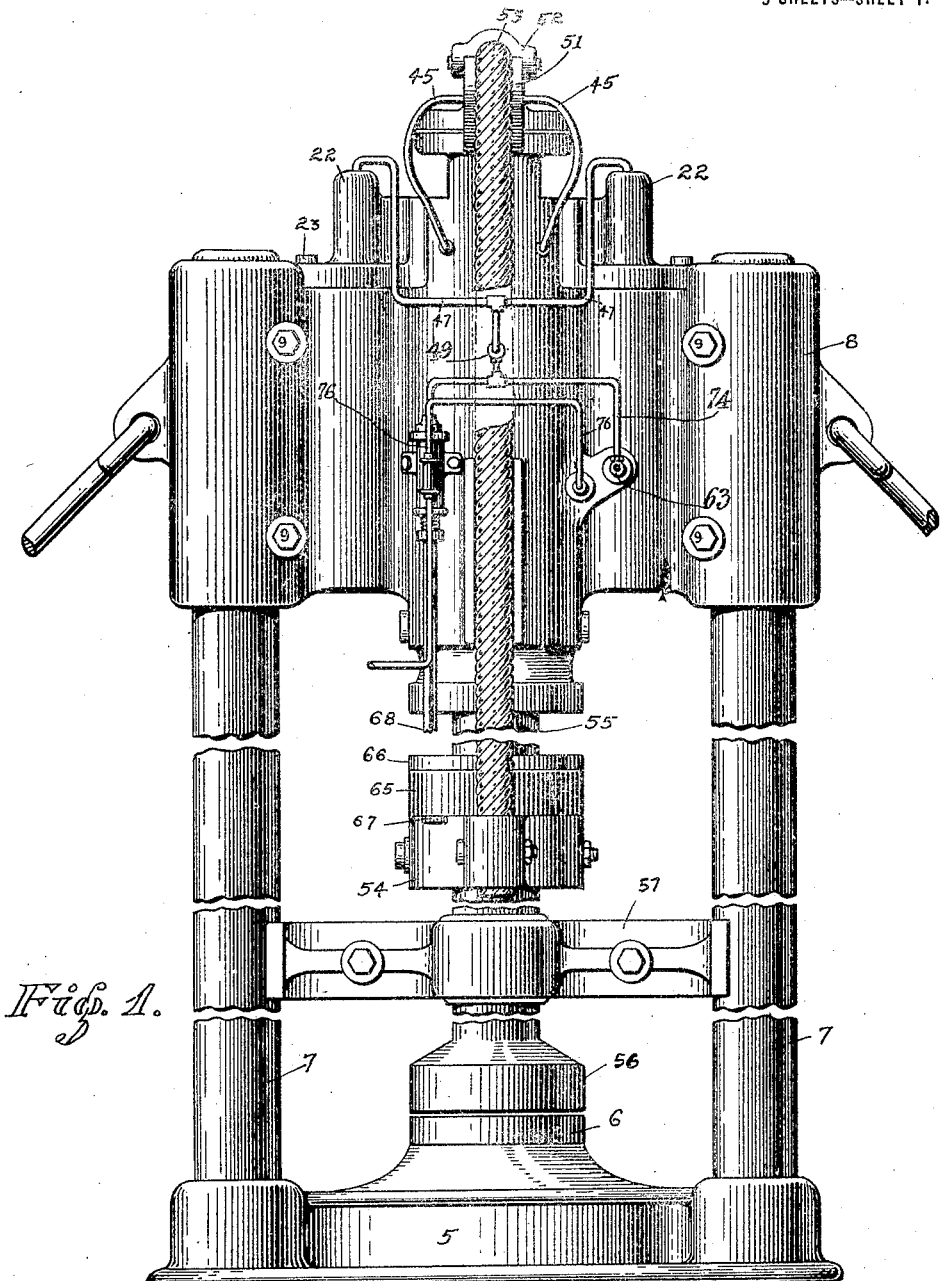
Figure 1 is a rear elevation of my improved stamp.
Figure 2:
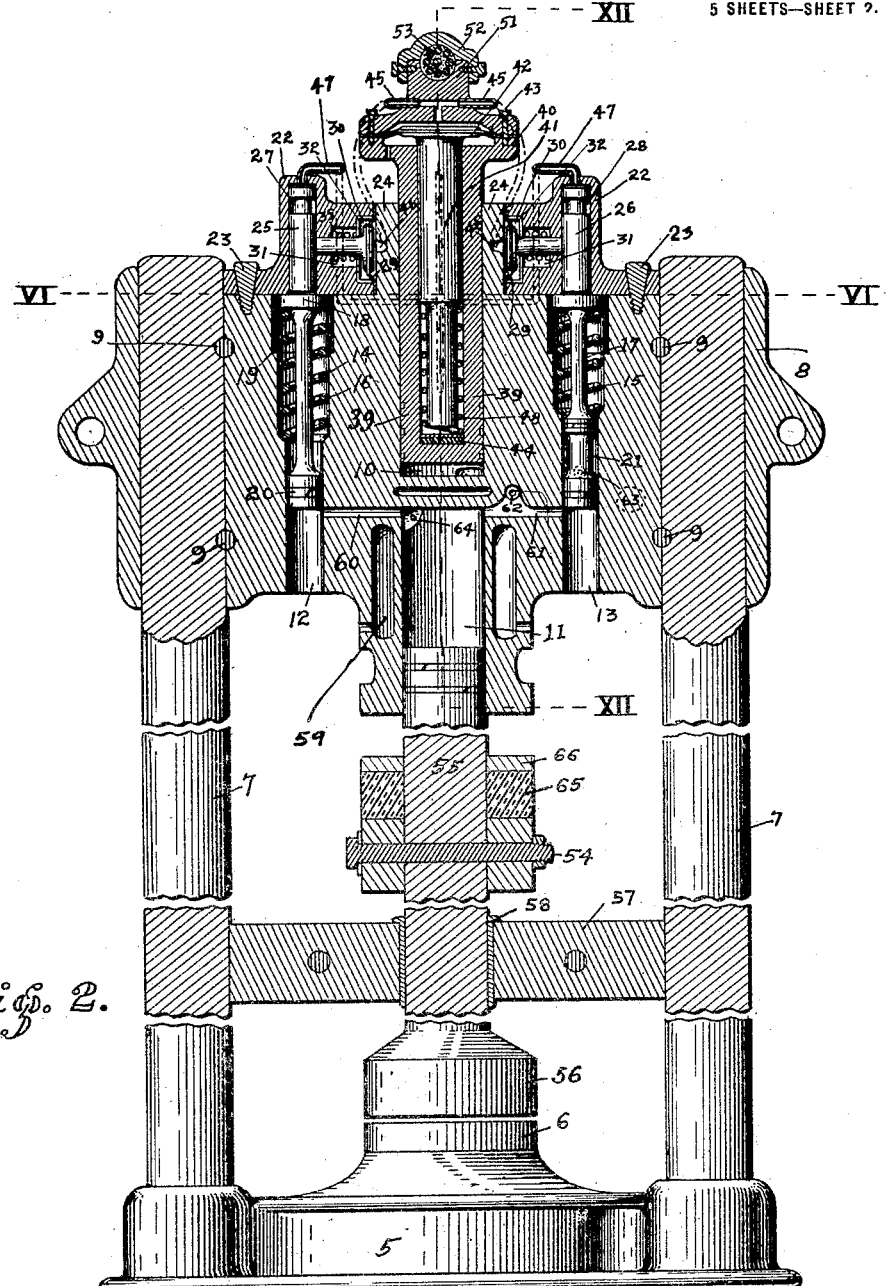
Fig. 2 is a vertical section of Fig. 1 looking from the opposite side of Fig. 1.

The operation of my device is as follows:

Assuming that the parts are in the position shown in Fig. 2, the stamp has just completed a downstroke or is at rest. The valve 82 is opened slightly, or as much as desired, depending upon the speed at which the stamp is to be operated. Air now passes from tank 78 through pipe 79, by-pass 81 and into the lifting chamber 10. This causes lifting plunger 39 to rise carrying with it plunger 55 to which it is attached through the flexible cable 53. When the lifting piston 39 reaches a predetermined height, compressed air will escape through the port 49 and pass through pipes 47 to the tops of valve depressing pins 25 and 26. These in turn will depress valves 16 and 17, which valves will be held depressed by latches 34, which in turn are held in engagement by springs 38. This will result in compressed air being released from port 63 to enter passage 61 where it will receive and mix with gasolene from the gasolene pump 70 disclosed in Fig. 4, which will be discharged through port 62. The pressure in the combustion chamber 11 will shortly balance the pressure in the chamber 10. As soon as this balance takes place, the weight of the stamp will tend to cause downward movement, and at this time the spark plug 64 will explode the mixture in the combustion chamber 11, which will drive the stamp downward with considerable force, and at the same time will draw the lifting piston to its position shown in the drawings through the flexible cable connection. The sudden stopping of the lifting piston will cause the inertia plunger to move downwardly and cause a vacuum in the upper end of the lifting piston. This vacuum will be transmitted through pipes 45, passage 46, and through the action upon the diaphragm 29 will withdraw the latches 34 which will allow the valves 16 and 17 to return to the position shown in the drawing. The air confined above the valve depressing pins will escape through the pipes 47 and groove 50 in the piston 39. The air within the lifting chamber 10 at the time of the explosion will be forced back into the air tank 78, past valve 80, which is of large diameter and sufficient to allow rapid return.

The action of my pump is automatic, and will continue as long as there is air in the tank 78 and the valve 82 is open for the escape of said air to the lifting piston.

I find that the employment of a flexible connection between my lifting piston and my explosion piston is of great advantage and decreases the vibration of the whole machine to a considerable extent.

Having thus described my invention, what I claim and desire to secure by Letters Patent is:

1. A stamp mill comprising a gravity dropping stamp, explosive means for augmenting the gravity drop of the stamp, and means comprising a piston rod, a piston and cylinder, and a flexible connection from said piston rod to said stamp for automatically raising the stamp after its drop back to its initial position for repeated dropping.

2. A stamp mill comprising a gravity dropping stamp, an internal combustion engine adapted to augment the gravity drop of the stamp by an explosion of gases, a compressed air device including a flexible connecting member adapted to raise the stamp after its drop back to initial position for repeated dropping.

3. A stamp mill comprising a gravity dropping stamp, an internal combustion engine adapted to augment the gravity drop of the stamp by an explosion of gases, a compressed air device adapted to raise the stamp after its drop back to initial position for repeated dropping, and means for conveying the compressed air after raising the stamp to the compressed air device for repeated operation.

4. In percussive apparatus the combination of a base, supports mounted on the base, a casting carried by said supports, chambers in said casting located in axial alinement one above the other, one of said chambers opening upwardly and the other downwardly, moving pistons in said chambers, valved means actuated by pressure variations and controlling the movement of the pistons, and a flexible connection between said moving pistons.

5. In percussive apparatus the combination of a base, supports mounted on the base, a casting carried by said supports, chambers in said casting located in axial alinement one above the other, one of said chambers opening upwardly and the other downwardly, moving pistons in said chambers, valved means actuated by pressure variations and controlling the movement of the pistons, a flexible connection between said moving pistons, spring-operated valves mounted in said passages, and ports adapted to be opened and closed by said valves.

6. In percussive apparatus the combination of a base, supports mounted on the base, a casting carried by said supports, chambers in said casting located in axial alinement one above the other, one of said chambers opening upwardly and the other downwardly, moving pistons in said chambers, valved means actuated by pressure variations and controlling the movement of the pistons, a flexible connection between said moving pistons, spring-operated valves mounted in said passages, ports adapted to be opened and closed by said valves, castings mounted above said valves, reciprocating valve-depressing pins carried within said castings and adapted to depress said valves, and vacuum-actuated latches adapted to engage said valve-depressing pins.

7. In percussive apparatus the combination of two reciprocating plungers in axial alinement, one of said plungers being hollow, an inertia plunger mounted within said hollow plunger and normally held upwardly by a spring, a flexible diaphragm engaged by the head of said inertia plunger, and a vacuum chamber above said diaphragm and a flexible connection between the plungers.

8. In percussive apparatus the combination of two reciprocating plungers in axial alinement, one of said plungers being hollow, an inertia plunger mounted within said hollow plunger and normally held upwardly by a spring, a flexible diaphragm engaged by the head of said inertia plunger, a vacuum chamber above said diaphragm, valves mounted parallel to said plungers, castings mounted above said valves, depressing pins mounted within said castings, vacuum latches mounted within said castings and engaged by diaphragms, and a conduit connecting the vacuum chamber above the inertia plunger to said vacuum latches.

9. In an engine for percussive apparatus, a cylinder and a piston therein adapted to be raised by compressed air, a second piston and means engaging it to move with the first named piston, an explosive chamber for the second piston, valved means admitting an explosive mixture to said chamber intermittently, and means for exploding said mixture to increase a percussive stroke of said second named piston.

10. In an engine for percussive apparatus, a cylinder and a piston therein adapted to be raised by compressed air, a second piston and means engaging it to move with the first named piston, an explosive chamber for the second piston, valved means admitting an explosive mixture to said chamber intermittently, and means for exploding said mixture to increase a percussive stroke of said second named piston, and a compressed air reservoir in constant communication with said cylinder.

11. In an engine for percussive apparatus, a cylinder and a piston therein adapted to be raised by compressed air, a second piston and means engaging it to move with the first named piston, an explosive chamber for the second piston, valved means admitting an explosive mixture to said chamber intermittently, and means for exploding said mixture to increase a percussive stroke of said second named piston, and a compressed air reservoir in constant communication with said cylinder, and reciprocating members engaging said valved means.

In testimony whereof I have hereunto set my hand at San Francisco, California, this 18th day of April 1919.

JAMES W. VAN METER.

In presence of—
P. S. PIDWELL.